United States Patent
Wang et al.

(10) Patent No.: US 11,107,293 B2
(45) Date of Patent: Aug. 31, 2021

(54) HEAD MOUNTED DISPLAY SYSTEM CAPABLE OF ASSIGNING AT LEAST ONE PREDETERMINED INTERACTIVE CHARACTERISTIC TO A VIRTUAL OBJECT IN A VIRTUAL ENVIRONMENT CREATED ACCORDING TO A REAL OBJECT IN A REAL ENVIRONMENT, A RELATED METHOD AND A RELATED NON-TRANSITORY COMPUTER READABLE STORAGE MEDIUM

(71) Applicant: XRSpace CO., LTD., Taoyuan (TW)

(72) Inventors: Chih-Wen Wang, New Taipei (TW);
Chia-Ming Lu, Taipei (TW);
Feng-Seng Chu, New Taipei (TW);
Wei-Shuo Chen, Kaohsiung (TW)

(73) Assignee: XRSpace CO., LTD., Taoyuan (TW)

( * ) Notice: Subject to any disclaimer, the term of this patent is extended or adjusted under 35 U.S.C. 154(b) by 0 days.

(21) Appl. No.: 16/392,615

(22) Filed: Apr. 23, 2019

(65) Prior Publication Data
US 2020/0342682 A1 Oct. 29, 2020

(51) Int. Cl.
*G06T 19/20* (2011.01)
*G06F 3/01* (2006.01)
(Continued)

(52) U.S. Cl.
CPC ............ *G06T 19/20* (2013.01); *G02B 27/017* (2013.01); *G06F 3/011* (2013.01);
(Continued)

(58) Field of Classification Search
None
See application file for complete search history.

(56) References Cited

U.S. PATENT DOCUMENTS 8,606,657 B2 12/2013 Chesnut
10,429,923 B1 * 10/2019 Johnston ................. G06F 3/011
(Continued)

FOREIGN PATENT DOCUMENTS

CN 104238738 A 12/2014
CN 105528082 A 4/2016
(Continued)

OTHER PUBLICATIONS

Search Report dated Oct. 28, 2019 for EP application No. 19172445.9, pp. 1-8.

(Continued)

*Primary Examiner* — Steven Z Elbinger
(74) *Attorney, Agent, or Firm* — Winston Hsu

(57) ABSTRACT

A head mounted display system includes a scanning unit and a processing unit. The scanning unit is configured to scan a real object in a real environment so as to generate a scanning result. The processing unit is coupled to the scanning unit. The processing unit is configured to identify the real object according to the scanning result of the scanning unit, determine at least one predetermined interactive characteristic according to an identification result of the processing unit, create a virtual object in a virtual environment corresponding to the real object in the real environment according to the scanning result of the scanning unit, and assign the at least one predetermined interactive characteristic to the virtual object in the virtual environment. Therefore, the present disclosure allows a user to manipulate the virtual object in different ways more naturally, which effectively improves the user's interactive experience.

15 Claims, 8 Drawing Sheets

(51) Int. Cl.
*G06K 9/00* (2006.01)
*G02B 27/01* (2006.01)
*G06T 19/00* (2011.01)

(52) U.S. Cl.
CPC ..... *G06K 9/00201* (2013.01); *G06K 9/00355* (2013.01); *G06T 19/006* (2013.01); *G02B 2027/0138* (2013.01); *G02B 2027/0187* (2013.01)

(56) References Cited

U.S. PATENT DOCUMENTS

| | | | |
|---|---|---|---|
| 2013/0117377 A1* | 5/2013 | Miller | H04L 67/38 709/205 |
| 2014/0225918 A1 | 8/2014 | Mittal | |
| 2015/0042568 A1 | 2/2015 | Krah | |
| 2015/0317518 A1* | 11/2015 | Fujimaki | G02B 27/017 345/633 |
| 2016/0049004 A1* | 2/2016 | Mullins | G06F 3/011 345/419 |
| 2016/0184703 A1 | 6/2016 | Bray | |
| 2016/0232708 A1 | 8/2016 | Kim | |
| 2017/0185830 A1 | 6/2017 | Srivastava | |
| 2017/0242488 A1 | 8/2017 | Levesque | |
| 2018/0101990 A1 | 4/2018 | Yang | |
| 2018/0365897 A1 | 12/2018 | Pahud | |
| 2019/0188450 A1* | 6/2019 | Spivack | G06K 9/00369 |
| 2020/0117336 A1* | 4/2020 | Mani | G06F 3/0304 |

FOREIGN PATENT DOCUMENTS

| | | |
|---|---|---|
| CN | 107533369 A | 1/2018 |
| JP | 2016-521882 A | 7/2016 |
| JP | 2016-148968 A | 8/2016 |
| TW | 201816548 A | 5/2018 |
| WO | 2012/135553 A1 | 10/2012 |
| WO | 2018007351 A1 | 1/2018 |
| WO | 2019/021566 A1 | 1/2019 |

OTHER PUBLICATIONS

Office action dated Mar. 10, 2020 for the Taiwan application No. 108117942, filed May 24, 2019, p. 1-9.
Office Action dated Aug. 4, 2020 for the Japanese Application No. 2019-090709, filed May 13, 2019, pp. 1-4.

* cited by examiner

HEAD MOUNTED DISPLAY SYSTEM CAPABLE OF ASSIGNING AT LEAST ONE PREDETERMINED INTERACTIVE CHARACTERISTIC TO A VIRTUAL OBJECT IN A VIRTUAL ENVIRONMENT CREATED ACCORDING TO A REAL OBJECT IN A REAL ENVIRONMENT, A RELATED METHOD AND A RELATED NON-TRANSITORY COMPUTER READABLE STORAGE MEDIUM

BACKGROUND OF THE INVENTION

1. Field of the Invention

The present disclosure relates to a head mounted display system, a related method and a related non-transitory computer readable storage medium, and more particularly, to a head mounted display system capable of assigning at least one predetermined interactive characteristic to a virtual object in a virtual environment created according to a real object in a real environment, a related method and a related non-transitory computer readable storage medium.

2. Description of the Prior Art

With the advancement and development of technology, the demand of interactions between a computer game and a user is increased. Human-computer interaction technology, e.g. somatosensory games, virtual reality (VR) environment, augmented reality (AR) environment, mixed reality (MR) environment and extended reality (XR) environment, becomes popular because of its physiological and entertaining function. A conventional display apparatus, such as a head mounted display (HMD), usually utilizes a camera for capturing images of a real object in a real environment, so as to obtain information of the real object at least including color, texture, and geometric shape of the real object and further to create a virtual object in a virtual environment according to the obtained information. However, after the virtual object is created, the user cannot manipulate the virtual object naturally, i.e., the virtual object does not have the same interaction behaviors as the operated real object, which causes a negative effect on the user's interactive experience.

SUMMARY OF THE INVENTION

It is an objective of the present disclosure to provide a head mounted display system capable of assigning at least one predetermined interactive characteristic to a virtual object in a virtual environment created according to a real object in a real environment, a related method and a related non-transitory computer readable storage medium.

In order to achieve the aforementioned objective, the present disclosure discloses a head mounted display system. The head mounted display system includes a scanning unit and a processing unit. The scanning unit is configured to scan a real object in a real environment so as to generate a scanning result. The processing unit is coupled to the scanning unit. The processing unit is configured to identify the real object according to the scanning result of the scanning unit, determine at least one predetermined interactive characteristic according to an identification result of the processing unit, create a virtual object in a virtual environment corresponding to the real object in the real environment according to the scanning result of the scanning unit, and assign the at least one predetermined interactive characteristic to the virtual object in the virtual environment.

In order to achieve the aforementioned objective, the present disclosure further discloses a method of utilizing a head mounted display system to create a virtual object in a virtual environment corresponding to a real object in a real environment. The method includes utilizing a scanning unit of the head mounted display system to scan the real object in the real environment so as to generate a scanning result; and utilizing a processing unit of the head mounted display system to identify the real object according to the scanning result of the scanning unit, determine at least one predetermined interactive characteristic according to an identification result of the processing unit, create the virtual object in the virtual environment corresponding to the real object in the real environment according to the scanning result of the scanning unit, and assign the at least one predetermined interactive characteristic to the virtual object in the virtual environment.

In order to achieve the aforementioned objective, the present disclosure further discloses a non-transitory computer readable storage medium storing a program that causes a head mounted display system to execute a process. The process includes utilizing a scanning unit of the head mounted display system to scan a real object in a real environment so as to generate a scanning result; and utilizing a processing unit of the head mounted display system to identify the real object according to the scanning result of the scanning unit, determine at least one predetermined interactive characteristic according to an identification result of the processing unit, create the virtual object in the virtual environment corresponding to the real object in the real environment according to the scanning result of the scanning unit, and assign the at least one predetermined interactive characteristic to the virtual object in the virtual environment.

In summary, the present disclosure not only creates the virtual object in the virtual environment according to the scanning result of the scanning unit but also assigns the at least one predetermined interactive characteristic to the virtual object in the virtual environment. Since the at least one predetermined interactive characteristic is determined according to the identification result, which is generated by identifying the real object in the real environment, it allows a user to manipulate the virtual object in the virtual environment in different ways more naturally. Therefore, the present disclosure can effectively improve the user's interactive experience.

These and other objectives of the present disclosure will no doubt become obvious to those of ordinary skill in the art after reading the following detailed description of the preferred embodiment that is illustrated in the various figures and drawings.

DETAILED DESCRIPTION

Figure 1:
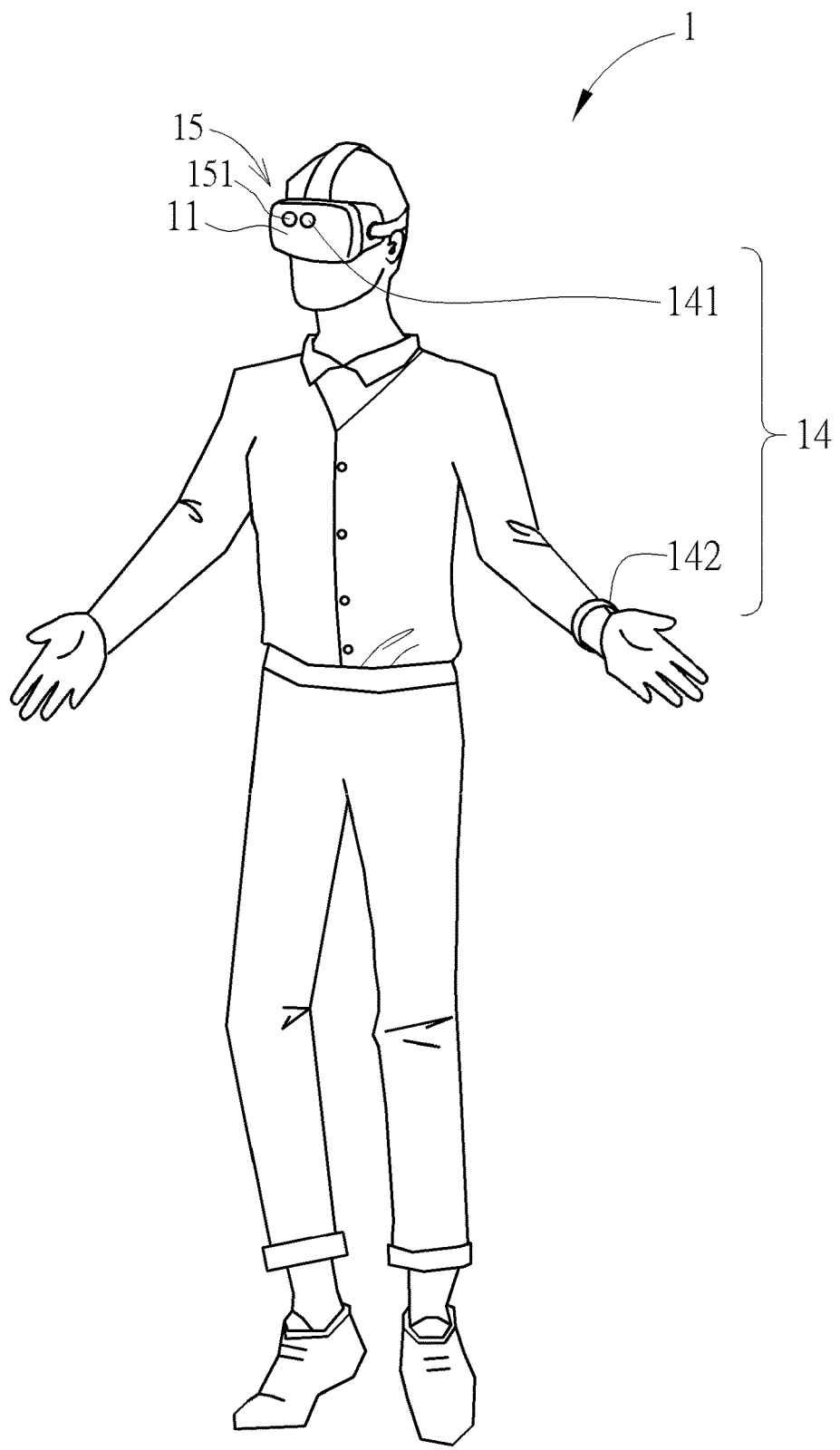
FIG. 1 is a diagram of a head mounted display system according to a first embodiment of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . " In addition, to simplify the descriptions and make it more convenient to compare between each embodiment, identical components are marked with the same reference numerals in each of the following embodiments. Please note that the figures are only for illustration and the figures may not be to scale. Also, the term "couple" is intended to mean either an indirect or direct electrical/mechanical connection. Thus, if a first device is coupled to a second device, that connection may be through a direct electrical/mechanical connection, or through an indirect electrical/mechanical connection via other devices and connections.

Figure 2:
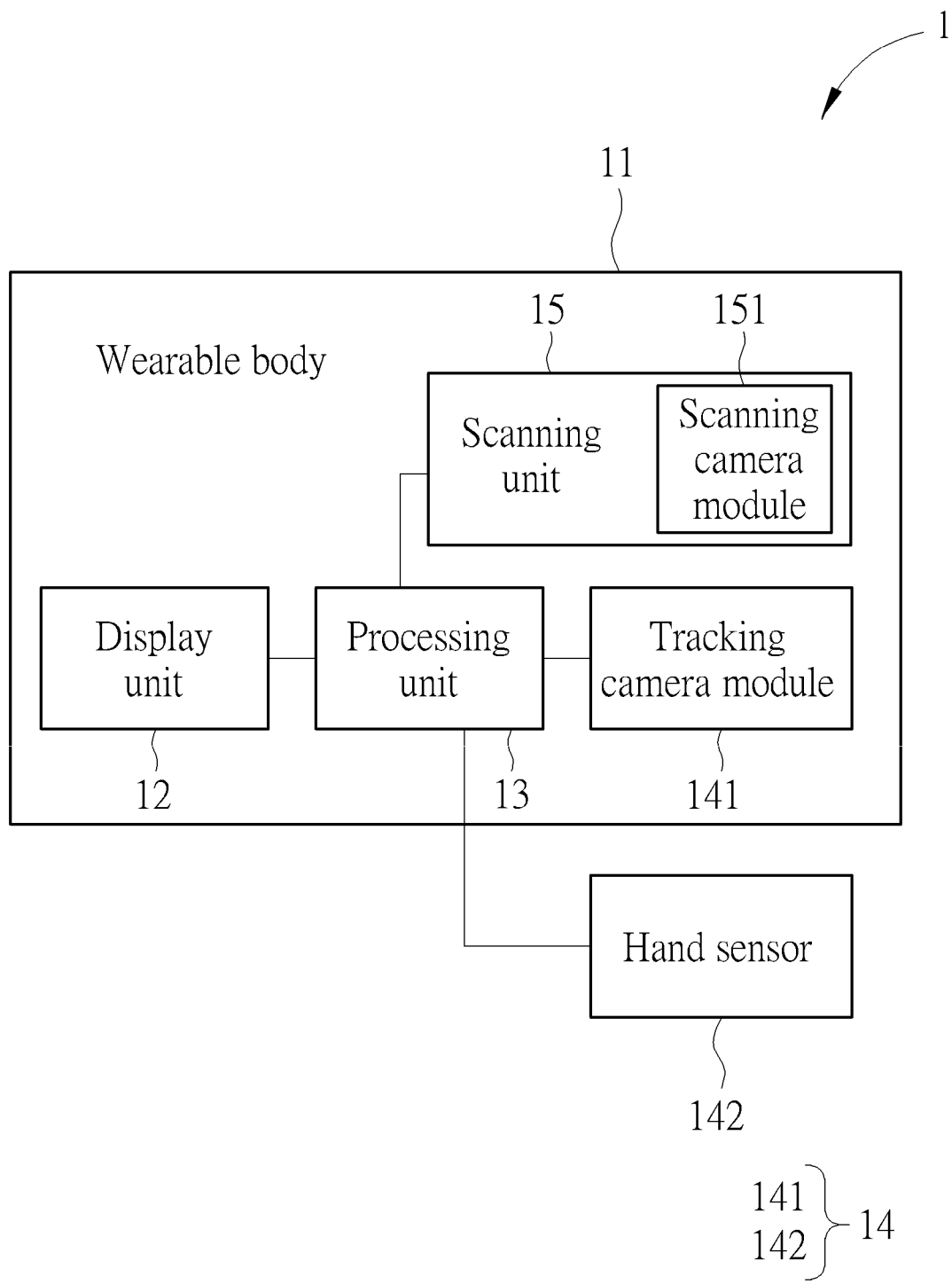
FIG. 2 is a functional block diagram of the head mounted display system according to the first embodiment of the present disclosure.

Please refer to FIG. 1 and FIG. 2. FIG. 1 is a diagram of a head mounted display system 1 according to a first embodiment of the present disclosure. FIG. 2 is a functional block diagram of the head mounted display system 1 according to the first embodiment of the present disclosure. As shown in FIG. 1 and FIG. 2, the head mounted display system 1 includes a wearable body 11, which can be worn by a user, a display unit 12, a processing unit 13, a tracking unit 14 and a scanning unit 15.

The display unit 12 is configured to display images, such as images of a virtual environment, to the user. In this embodiment, the display unit 12 can be mounted on the wearable body 11 and can be a liquid crystal display (LCD), light-emitting diode (LED) display, an organic light-emitting diode (OLED) display, or any other display. However, the present disclosure is not limited thereto.

The tracking unit 14 is configured to track the user's hands, so as to generate a tracking result with at least one interactive input. Specifically, in this embodiment, the tracking unit 14 can include a tracking camera module 141 mounted on the wearable body 11 for capturing images of the user's hands, at least one hand sensor 142 with an inertial measurement unit, such as a gyroscope, an accelerometer, a magnetic sensor or a combination thereof, and worn on at least one of the user's hands, or a combination thereof, so as to track a hand gesture and a hand movement of the user, and the at least one interactive input can include a manipulating point, a manipulating hand gesture and a manipulating movement of the user's hands.

However, the present disclosure is not limited to this embodiment. For example, in another embodiment, the tracking unit can track at least one of the hand gesture and the hand movement, and the at least one interactive input can include at least one of the manipulating point, the manipulating hand gesture and the manipulating movement of the user's hands. Alternatively, in another embodiment, the tracking unit can include a tracking camera module and/or at least one lower body sensor with a inertial measurement unit and worn on the user's lower body, so as to track a lower body movement of the user, and the at least one interactive input can include at least one of a manipulating point and a manipulating movement of the user's lower body. Alternatively, in another embodiment, the tracking unit can include a tracking camera for tracking the user's eye gaze, and the at least one interactive input can include at least one of a manipulating point and a manipulating movement of the user's eye gaze. Alternatively, the tracking unit can include a tracking camera module and/or a inertial measurement unit disposed on a remote controller for tracking at least one of a position, an orientation, a pose and a movement of the remote controller, and the at least one interactive input can include at least one of a manipulating point and a manipulating movement of the remote controller.

The scanning unit 15 is configured to scan a real object in a real environment so as to generate a scanning result. In this embodiment, the scanning unit 15 can include a scanning camera module 151 mounted on the wearable body 11 for capturing images of the real object in the real environment. However, the present disclosure is not limited to this embodiment. For example, in another embodiment, there can be only one camera module which combines functions of the tracking camera module and the scanning camera module for generating the tracking result and the scanning result, i.e., the scanning unit and the tracking unit can be integrated for achieving a purpose of simplification of structure.

The processing unit 13 is coupled to the tracking unit 14 and the scanning unit 15. The processing unit 13 is configured to identify the real object according to the scanning result of the scanning unit, determine at least one predetermined interactive characteristic according to an identification result of the processing unit, create a virtual object in a virtual environment corresponding to the real object in the real environment according to the scanning result of the scanning unit, and assign the at least one predetermined interactive characteristic to the virtual object in the virtual environment, so that the virtual object is allowed to be manipulated according to the at least one interactive input of the tracking result of the tracking unit when the at least one interactive input of the tracking result of the tracking unit meets the at least one predetermined interactive characteristic. The at least one predetermined interactive characteristic can be stored in a storage element, such as RAM, ROM or the like, of the head mounted display system 1. In this embodiment, the processing unit 13 can be implemented in software, firmware, hardware configuration, or a combination thereof. For example, the processing unit 13 can be a processor, such as a central processing unit, an application processor, a microprocessor, etc., which is mounted on the wearable body 11, or can be realized by an application specific integrated circuit (ASIC), which is mounted on the wearable body 11. However, the present disclosure is not limited thereto.

Furthermore, in this embodiment, the at least one predetermined interactive characteristic can include a predetermined manipulating point, a predetermined manipulating hand gesture and a predetermined manipulating movement. However, the present disclosure is not limited to this embodiment. For example, in another embodiment, the at least one predetermined interactive characteristic can include at least one of the predetermined manipulating point, the predetermined manipulating hand gesture and the predetermined manipulating movement. Alternatively, in another embodiment, which will be described later, the predetermined interactive characteristic can further include at least one of a predetermined framework, a predetermined reacting point, a predetermined reacting movement and a predetermined reacting effect.

Besides, in this embodiment, the display unit 12, the processing unit 13, the tracking unit 14 and the scanning unit 15 are disposed on the wearable body 11. However, the present disclosure is not limited to this embodiment. For example, in another embodiment, the head mounted display system further includes a remote computing apparatus disposed away from the wearable body separately and a communication module disposed on the wearable body for constructing a communication channel to the remote computing apparatus. The remote computing apparatus can be an edge computing device, a cloud computing device, a local host computer, a remote sever, a smartphone, or the like. The communication module can establish a wired connection or a wireless connection between elements on the wearable body and elements on the remote computing apparatus. The processing unit, the tracking unit or the scanning unit can be at least partly disposed on the remote computing apparatus other than the wearable body and/or distributes part of the tasks to the remote computing apparatus, so that the scanning result of the scanning unit, the tracking result of the tracking unit or data of the processing unit, such as the identification result and the at least one predetermined interactive characteristic, can be transmitted between the remote computing apparatus and the wearable body via the communication module, so as to reduce the size and calculation of the wearable body, which makes the wearable body lightweight and portable.

Figure 3:
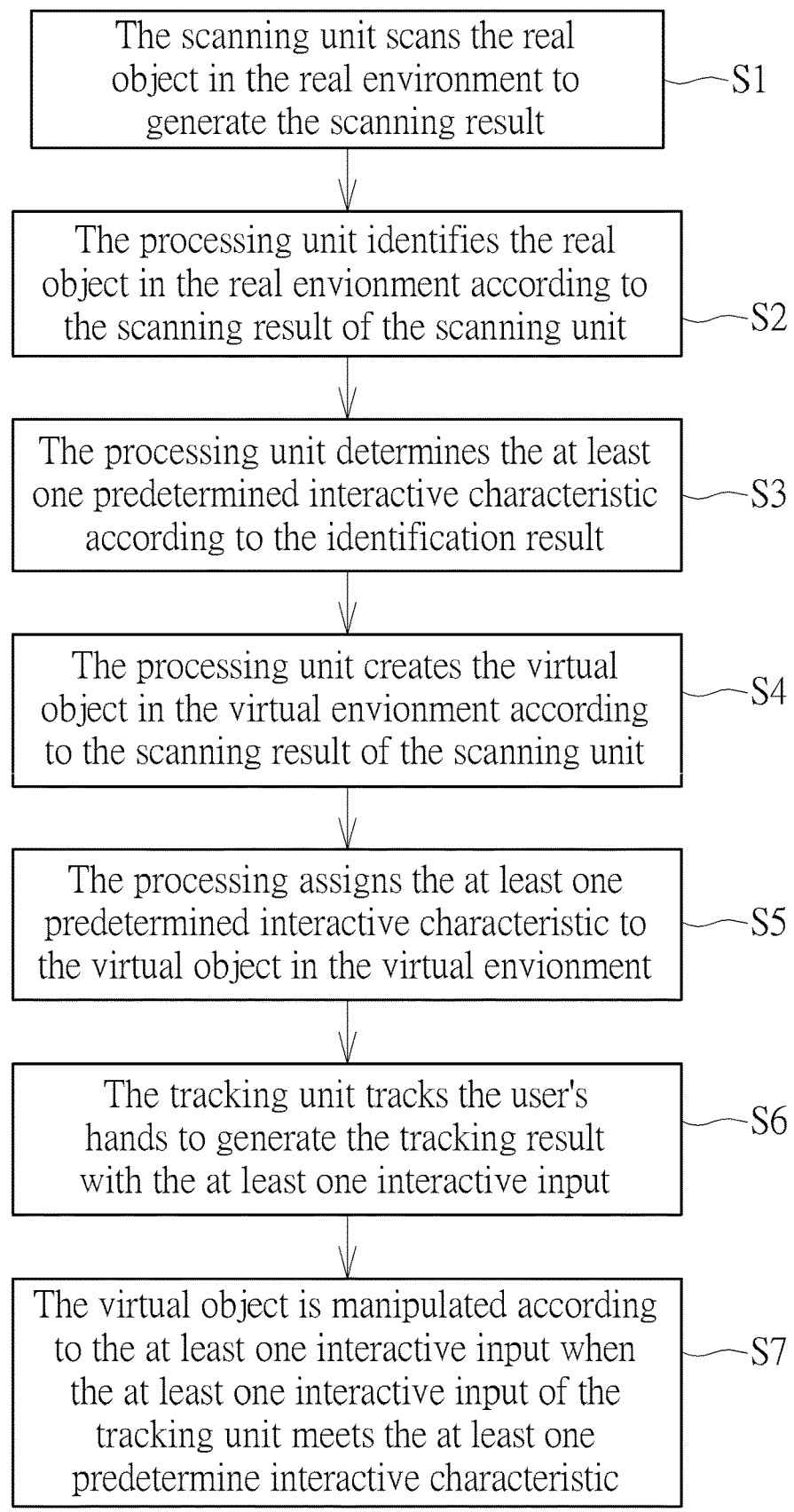
FIG. 3 is a flow chart diagram illustrating a method of utilizing the head mounted display system to create a virtual object in a virtual environment corresponding to a real object in a real environment according to the first embodiment of the present disclosure.

Please refer to FIG. 3. FIG. 3 is a flow chart diagram illustrating a method of utilizing the head mounted display system to create the virtual object in the virtual environment corresponding to the real object in the real environment according to the first embodiment of the present disclosure. As shown in FIG. 3, the method includes the following steps:

S1: The scanning unit 15 scans the real object in the real environment to generate the scanning result.

S2: The processing unit 13 identifies the real object in the real environment according to the scanning result of the scanning unit 15.

S3: The processing unit 13 determines the at least one predetermined interactive characteristic according to the identification result.

S4: The processing unit 13 creates the virtual object in the virtual environment according to the scanning result of the scanning unit 15.

S5: The processing 13 assigns the at least one predetermined interactive characteristic to the virtual object in the virtual environment.

S6: The tracking unit 14 tracks the user's hands to generate the tracking result with the at least one interactive input.

S7: The virtual object is manipulated according to the at least one interactive input when the at least one interactive input of the tracking unit meets the at least one predetermine interactive characteristic.

Detailed description for the steps is provided as follows. In step S1, when it is desired to create the virtual object corresponding to the real object and enable the virtual object in the virtual environment to be manipulated like the real object in the real environment by the user, the user can wear the wearable body 11 and utilize the scanning unit 15 to scan the real object in the real environment to generate the scanning result which at least includes the color, texture, and geometric shape of the real object. In steps S2 and S3, the processing unit 13 can identify the real object in the real environment according to the scanning result and further determine the at least one predetermined interactive characteristic according to the identification result. Afterwards, in steps S4 and S5, the processing unit 13 can create the virtual object in the virtual environment according to the scanning result of the scanning unit and assign the at least one predetermined interactive characteristic to the virtual object in the virtual environment. In steps S6 and S7, when the user desires to manipulate with the virtual object, the user can move the user's hands, so that the tracking unit 14 can track the user's hands to generate the tracking result with the at least one interactive input. Furthermore, the virtual object in the virtual environment is manipulated according to the at least one interactive input when the at least one interactive input of the tracking unit 14 meets the at least one predetermined interactive characteristic. Therefore, it allows the user to manipulate the virtual object in the virtual environment naturally.

Figure 4:
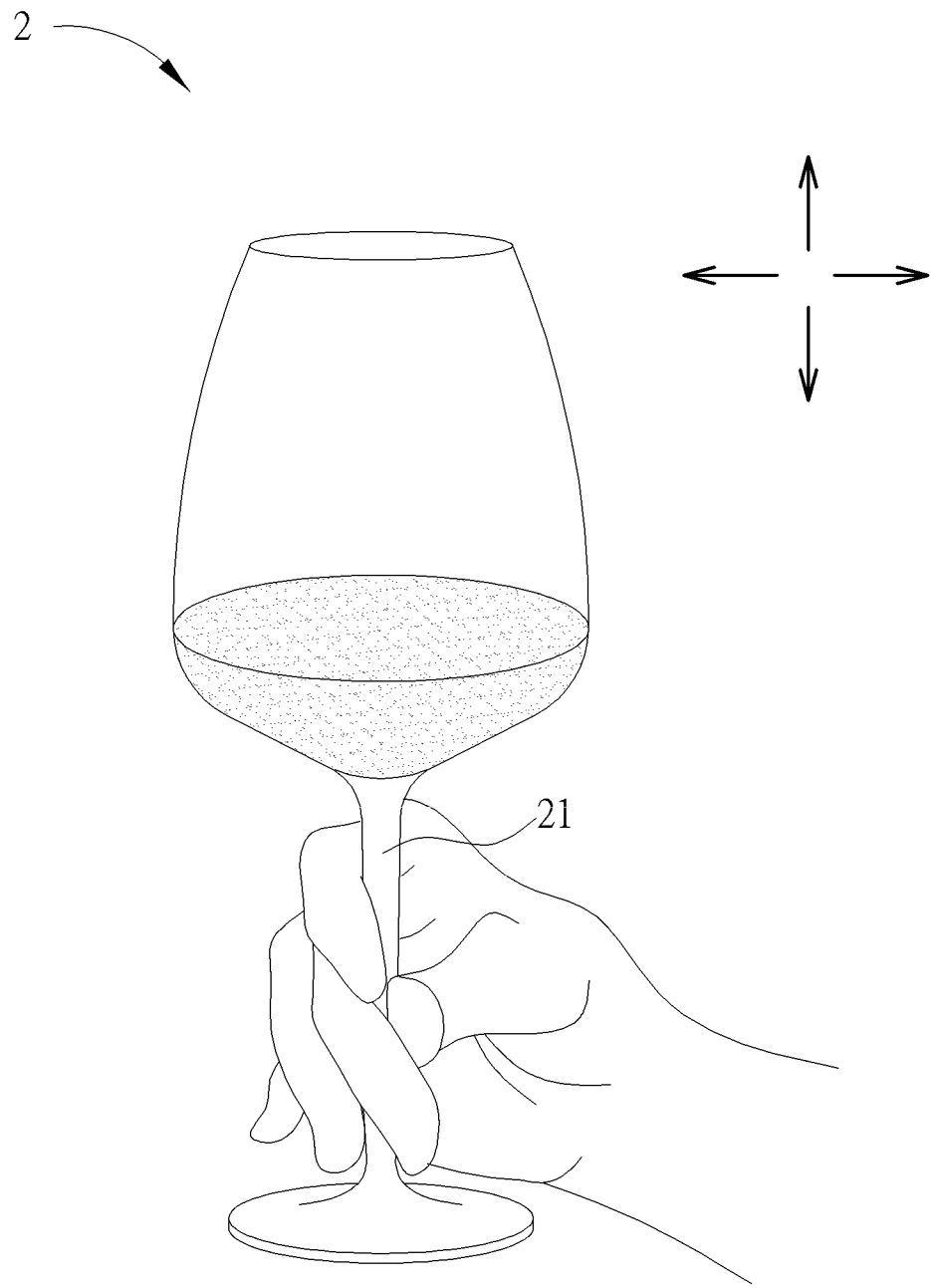
FIG. 4 is a diagram illustrating that the virtual object in the virtual environment is manipulated by a user according to the first embodiment of the present disclosure.

For example, please refer to FIG. 4. FIG. 4 is a diagram illustrating that the virtual object in the virtual environment is manipulated by the user according to the first embodiment of the present disclosure. As shown in FIG. 4, if the processing unit 13 identifies the real object in the real environment as a goblet according to the scanning result, the processing unit 13 can determine that the predetermined manipulating point, the predetermined manipulating hand gesture and the predetermined manipulating movement of the at least one predetermined interactive characteristic respectively refer to a stem portion of the goblet, a pinching gesture performed by the user and a translation movement. After the virtual object, i.e., a virtual goblet 2 which is shown in FIG. 4, is created, the aforementioned predetermined interactive characteristic is assigned to the virtual goblet 2, so that the virtual goblet 2 is allowed to be manipulated according to the at least one interactive input when the at least one interactive input of the tracking result meets the at least one predetermined interactive characteristic, i.e., the manipulating point, the manipulating hand gesture and the manipulating movement respectively meet the predetermined manipulating point, the predetermined manipulating hand gesture and the predetermined manipulating movement. Therefore, the virtual goblet is only allowed to be hold and manipulated to translate by pinching a stem portion 21 of the virtual goblet 2 between the user's thumb and forefinger and a translation movement of the user's hand, which allows the user to manipulate the virtual goblet 2 more naturally.

However, the present disclosure is not limited to this embodiment. For example, in another embodiment, the tracking unit also can track the user's hands and eyes at the same time, so as to generate the tracking result with the at least one interactive input. Specifically, the tracking unit can include two tracking camera modules. One of the two tracking camera modules is for tracking the hand gesture and the hand movement of the user, and the other one of the two tracking camera modules is for tracking the eye gaze of the user's eyes. The at least one interactive input can include the manipulating point of the eye gaze of the user's eyes, the manipulating hand gesture and the hand movement. In other words, different from the aforementioned embodiment, the manipulating point of this embodiment is determined by eye gazing. Therefore, the virtual goblet is allowed to be hold by gazing the stem portion of the goblet with the user's eyes, and the virtual goblet is further allowed to be manipulated to translate by making the translation movement with the pinching gesture with the user's thumb and forefinger freely without aiming at the stem portion of the virtual goblet, which brings convenience in use.

Besides, in another embodiment, a tracking result can be generated by tracking a remote controller. In other words, in this embodiment, the at least one interactive input can include a manipulating point and a manipulating movement of the remote controller, and the at least one interactive characteristic can include a predetermined manipulating point and a predetermined manipulating movement respectively referring to a stem portion of the goblet and a translation movement of the remote controller. Therefore, the virtual goblet is only allowed to be manipulated to translate by the translation movement of the remote controller pointing at the stem portion of the virtual goblet.

Figure 5:
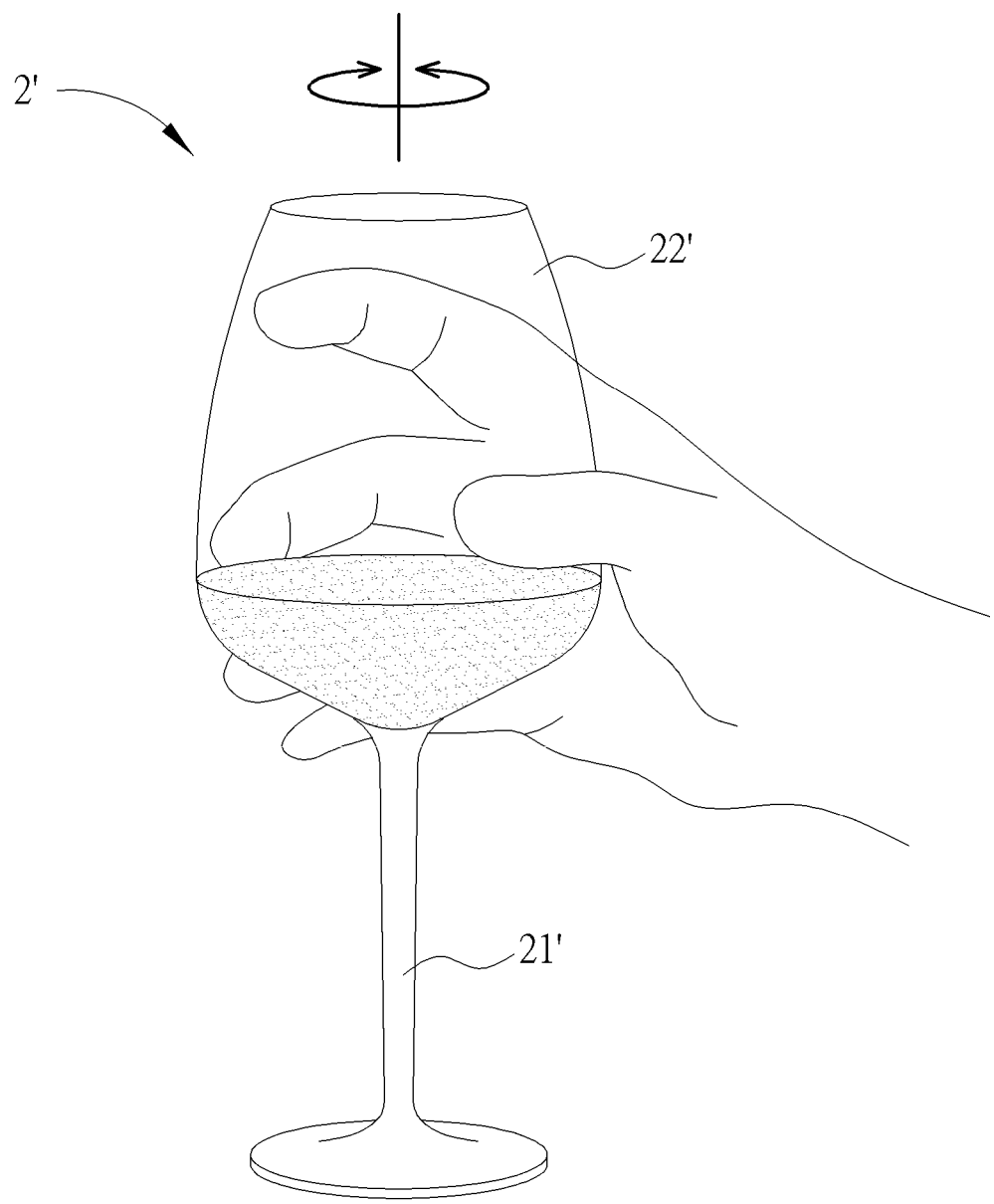
FIG. 5 is a diagram illustrating that a virtual object in a virtual environment is manipulated by a user in a first way according to a second embodiment of the present disclosure.
Figure 6:
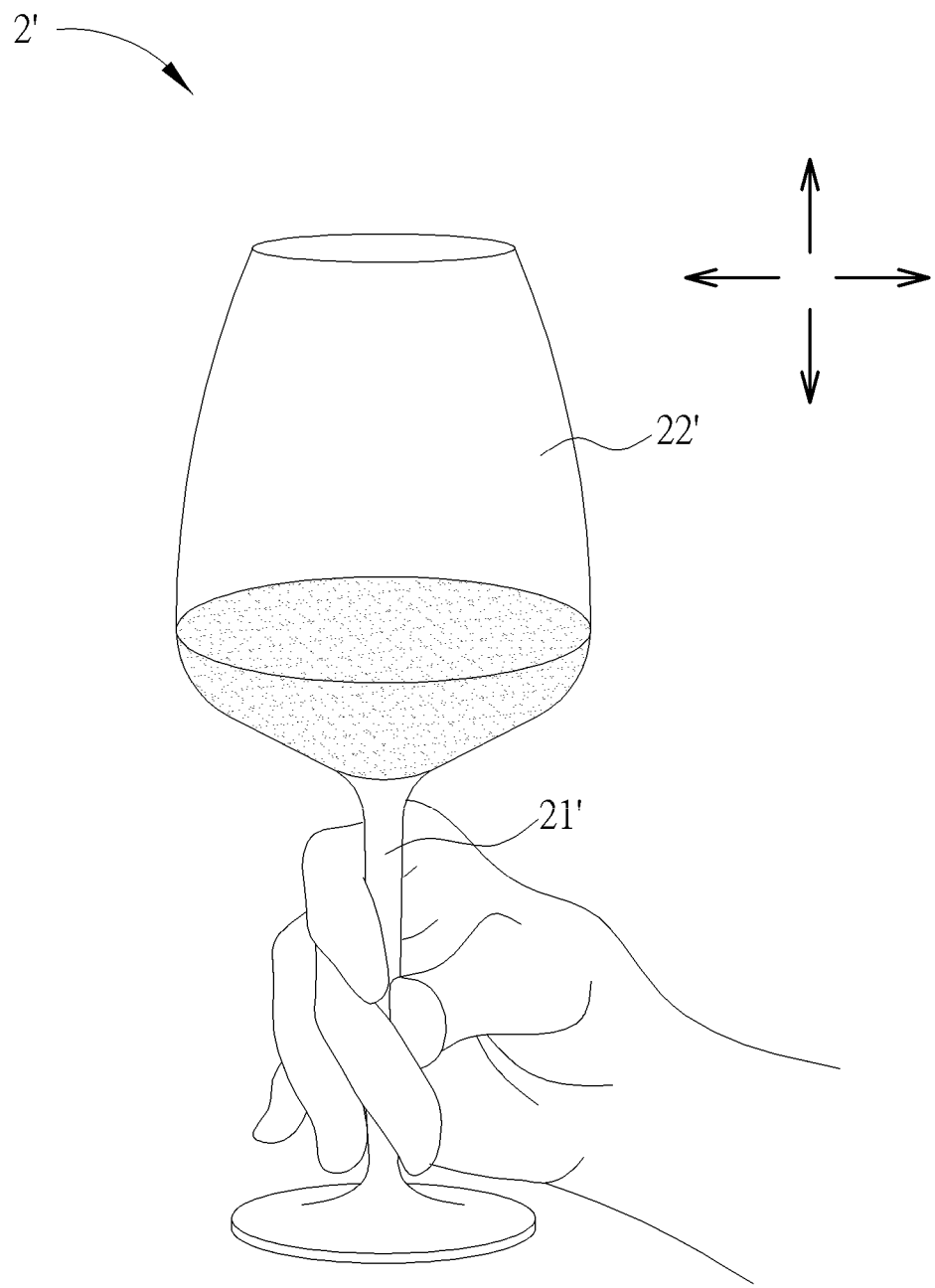
FIG. 6 is a diagram illustrating that the virtual object in the virtual environment is manipulated by the user in a second way according to the second embodiment of the present disclosure.

Furthermore, in another embodiment, the at least one predetermined interactive characteristic includes a plurality of predetermined interactive characteristics, and each predetermined interactive characteristic include at least one of a predetermined manipulating point, a predetermined manipulating hand gesture and a predetermined manipulating movement. Therefore, it allows the user to manipulate the virtual object in multiple ways. For example, please refer to FIG. 5 to FIG. 6. FIG. 5 is a diagram illustrating that a virtual object in a virtual environment is manipulated by a user in a first way according to a second embodiment of the present disclosure. FIG. 6 is a diagram illustrating that the virtual object in the virtual environment is manipulated by the user in a second way according to the second embodiment of the present disclosure. As shown in FIG. 5 to FIG. 6, the virtual object of this embodiment is a virtual goblet 2' in the virtual environment and corresponding to a goblet in the real environment. Different from the first embodiment, at least one predetermined interactive characteristic of this embodiment can include a first predetermined interactive characteristic and a second predetermined interactive characteristic. The first predetermined interactive characteristic can include a first predetermined manipulating point, a first predetermined manipulating hand gesture and a first predetermined manipulating movement, and the second predetermined interactive characteristic can include a second predetermined manipulating point, a second predetermined manipulating hand gesture and a second predetermined manipulating movement. The first predetermined manipulating point, the first predetermined manipulating hand gesture and the first predetermined manipulating movement can respectively refer to a top portion of the goblet, a full hand grasping gesture of the user's hand and a rotation movement of the goblet, and the second predetermined manipulating point, the second predetermined manipulating hand gesture and the second predetermined manipulating movement can refer to a stem portion of the goblet, a pinching gesture of the user's hand and a translation movement of the goblet. Therefore, it allows the user to manipulate the virtual goblet 2' in two different ways. The first way to manipulate the virtual goblet 2' is to rotate the virtual goblet 2' with the full hand grasping gesture of the user's hand aiming at a top portion 22' of the virtual goblet 2', and the second way to manipulate the virtual goblet is to translate the virtual goblet 2' with the pinching gesture of the user's hand aiming at a stem portion 21' of the virtual goblet 2'. However, the present disclosure is not limited to this embodiment. For example, in another embodiment, the first predetermined interactive characteristic can include at least one of the first predetermined manipulating point, the first predetermined manipulating hand gesture and the first predetermined manipulating movement, and the second predetermined interactive characteristic can include at least one of the second predetermined manipulating point, the second predetermined manipulating hand gesture and the second predetermined manipulating movement.

Figure 7:
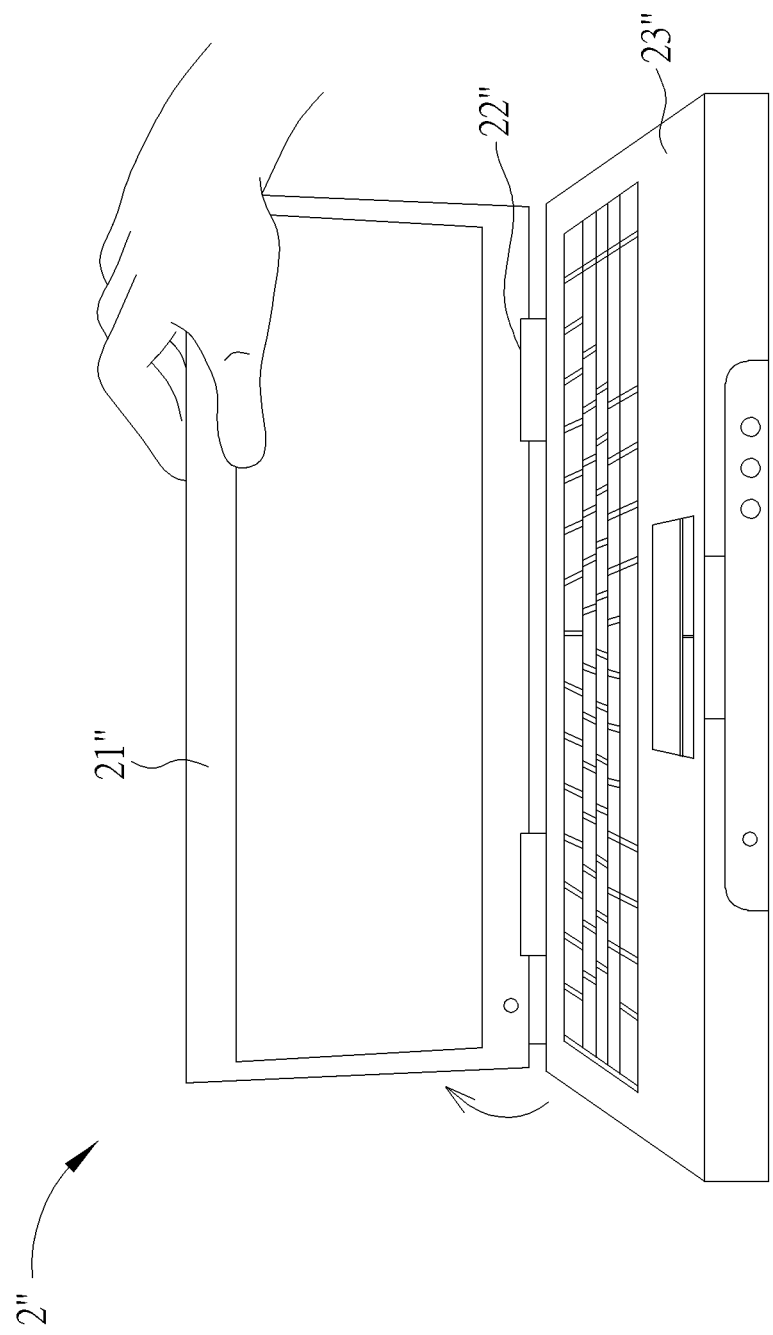
FIG. 7 is diagram illustrating that a virtual object in a virtual environment is manipulated by a user according to a third embodiment of the present disclosure.

Please refer to FIG. 7. FIG. 7 is diagram illustrating that a virtual object in a virtual environment is manipulated by a user according to a third embodiment of the present disclosure. As shown in FIG. 7, in this embodiment, the virtual object is a virtual laptop computer 2" in the virtual environment and corresponding to a laptop computer in the real environment and created according to a scanning result, and at least one predetermined interactive characteristic can be determined to include a predetermined framework, a predetermined manipulating point, and a predetermined manipulating movement according to an identification result. Specifically, after assigning the at least one predetermined interactive characteristic to the virtual laptop computer 2", the virtual laptop computer 2" can be divided into a top cover portion 21", a hinge portion 22" and a lower cover portion 23" according to the predetermined framework. Furthermore, the predetermined manipulating point and the predetermined manipulating movement can respectively refer to an opening side of a top cover portion of the laptop computer and a rotation movement of the top cover portion of the laptop computer relative to a lower cover portion of the laptop computer around a hinge portion of the laptop computer. Therefore, the top cover portion 21" of the virtual laptop computer 2" is allowed to be manipulated to be opened relative to the lower cover portion 23" around the hinge portion 22" by moving the opening side of the top cover portion 21" of the virtual laptop computer 2" with the user's thumb.

Figure 8:
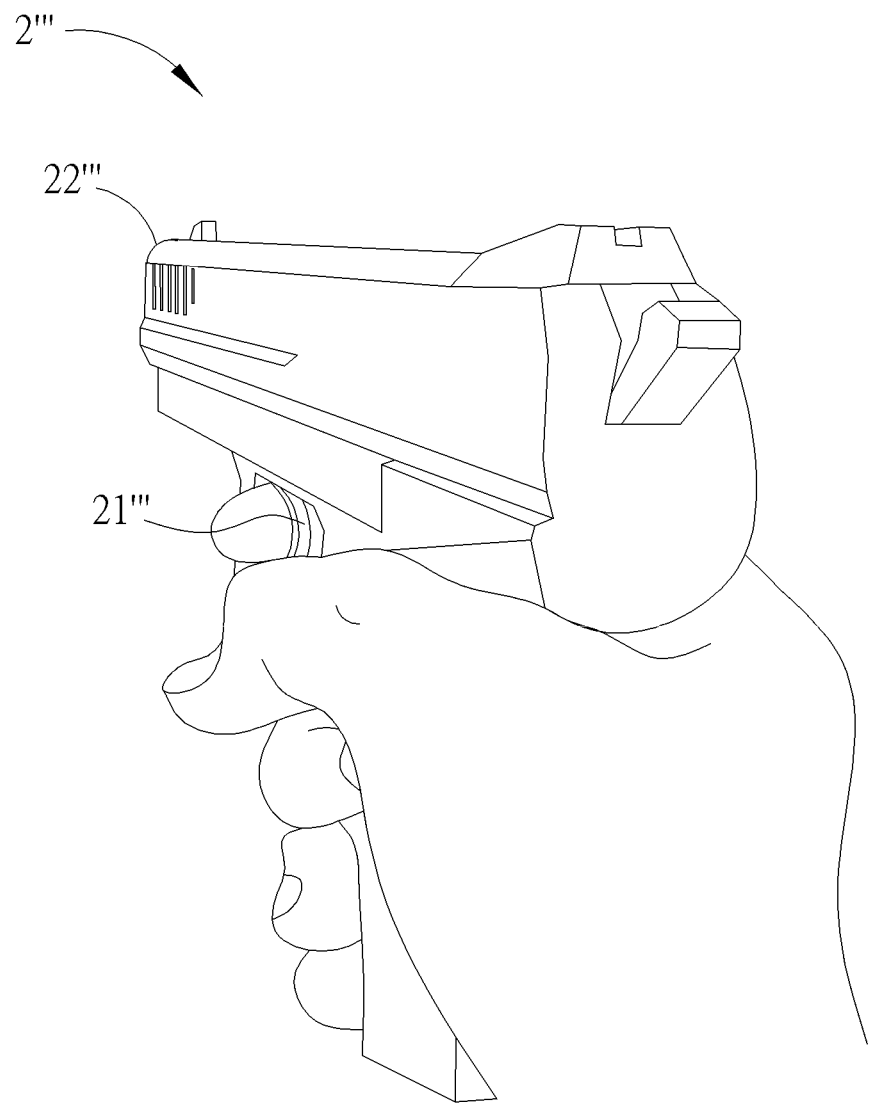
FIG. 8 is diagram illustrating that a virtual object in a virtual environment is manipulated by a user according to a fourth embodiment of the present disclosure.

Please refer to FIG. 8. FIG. 8 is diagram illustrating that a virtual object in a virtual environment is manipulated by a user according to a fourth embodiment of the present disclosure. As shown in FIG. 8, in this embodiment, the virtual object is a virtual pistol 2''' in the virtual environment corresponding to a pistol in the real environment and created according to a scanning result, and at least one predetermined interactive characteristic can be determined to include a predetermined manipulating point, a predetermined manipulating hand gesture, a predetermined manipulating movement, a predetermined reacting point, a predetermined reacting movement and a predetermined reacting effect according to an identification result. Specifically, the predetermined manipulating point, the predetermined manipulating hand gesture, the predetermined manipulating movement, the predetermined reacting point, the predetermined reacting movement and the predetermined reacting effect can respectively refer to a trigger portion of the pistol, a trigging gesture with the user's forefinger, a triggering movement of the user's forefinger, a muzzle portion of the pistol, an upward movement of the muzzle portion and a sparking effect. Therefore, it allows the user to manipulate the virtual pistol 2''' to produce a realistic shot along with the upward movement of a muzzle portion 22''' of the virtual pistol 2" and the sparking effect by triggering a trigger portion 21" of the virtual pistol 2" with the user's forefinger.

Furthermore, the above-described embodiments of the present disclosure can be implemented in software, firmware, hardware configuration, or combination thereof, and it is also possible to provide a non-transitory computer readable storage medium for storing a program that causes a head mounted display system to execute a process by a processor in accordance with the above-described methods of the present disclosure. The processor can be a central processing unit, an application processor, a microprocessor, etc., or can be realized by an application specific integrated circuit (ASIC). The computer-readable recording medium can be a Read-Only Memory (ROM), a random-access memory (RAM), a CD-ROM, a magnetic tape, a floppy disk, or an optical data storage device. However, the present disclosure is not limited thereto.

In contrast to the prior art, the present disclosure not only creates the virtual object in the virtual environment according to the scanning result of the scanning unit but also assigns the at least one predetermined interactive characteristic to the virtual object in the virtual environment. Since the at least one predetermined interactive characteristic is determined according to the identification result, which is generated by identifying the real object in the real environment, it allows a user to manipulate the virtual object in the virtual environment in different ways more naturally. Therefore, the present disclosure can effectively improve the user's interactive experience.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A head mounted display system comprising:
   a scanning unit configured to scan a real object in a real environment so as to generate a scanning result; and
   a processing unit coupled to the scanning unit, the processing unit being configured to identify the real object according to the scanning result of the scanning unit, determine a first predetermined interactive characteristic and a second predetermined interactive characteristic according to an identification result of the processing unit, create a virtual object in a virtual environment simulating the real object in the real environment according to the scanning result of the scanning unit, and assign the first predetermined interactive characteristic and the second predetermined interactive characteristic to the virtual object in the virtual environment, wherein the first predetermined interactive characteristic comprises a first predetermined manipulating point, a first predetermined manipulating hand gesture and a first predetermined manipulating movement, and the second predetermined interactive characteristic comprises a second predetermined manipulating point, a second predetermined manipulating hand gesture and a second predetermined manipulating movement, the virtual object is manipulated in a first predetermined manipulating manner when a manipulating point, a manipulating hand gesture and a manipulating movement of a user respectively correspond the first predetermined manipulating point, the first predetermined manipulating hand gesture and the first predetermined manipulating movement, the virtual object is not manipulated in the first predetermined manipulating manner when at least one of the manipulating point, the manipulating hand gesture and the manipulating movement of the user does not correspond to at least one of the first predetermined manipulating point, the first predetermined manipulating hand gesture and the first predetermined manipulating movement, the virtual object is manipulated in a second manipulating manner when the manipulating point, the manipulating hand gesture and the manipulating movement of the user respectively correspond the second predetermined manipulating point, the second predetermined manipulating hand gesture and the second predetermined manipulating movement, and the virtual object is not manipulated in the second predetermined manipulating manner when at least one of the manipulating point, the manipulating hand gesture and the manipulating movement of the user does not correspond to at least one of the second predetermined manipulating point, the second predetermined manipulating hand gesture and the second predetermined manipulating movement, and the second predetermined manipulating point, the second manipulating hand gesture and the second manipulating movement are different from the first predetermined manipulating point, the first manipulating hand gesture and the first manipulating movement.

2. The head mounted display system of claim 1, further comprising a tracking unit coupled to the processing unit and configured to track at least one of hands of a user, eyes of the user and a remote controller operated by the user, so as to generate a tracking result with at least one interactive input.

3. The head mounted display system of claim 2, wherein the virtual object is manipulated according to the at least one interactive input of the tracking result of the tracking unit when the at least one interactive input of the tracking result of the tracking unit meets the first predetermined interactive characteristic or the second predetermined interactive characteristic.

4. The head mounted display system of claim 3, wherein the at least one interactive input of the tracking result of the tracking unit comprises at least one of a manipulating point, a manipulating hand gesture and a manipulating movement.

5. The head mounted display system of claim 1, wherein the first predetermined interactive characteristic further comprises at least one of a first predetermined framework, a first predetermined reacting point, a first predetermined reacting movement and a first predetermined reacting effect, and the second predetermined interactive characteristic further comprises at least one of a second predetermined framework, a second predetermined reacting point, a second predetermined reacting movement and a second predetermined reacting effect.

6. A method of utilizing a head mounted display system to create a virtual object in a virtual environment corresponding to a real object in a real environment, the method comprising:
   utilizing a scanning unit of the head mounted display system to scan the real object in the real environment so as to generate a scanning result; and
   utilizing a processing unit of the head mounted display system to identify the real object according to the scanning result of the scanning unit, determine a first predetermined interactive characteristic and a second predetermined interactive characteristic according to an identification result of the processing unit, create the virtual object in the virtual environment simulating the real object in the real environment according to the scanning result of the scanning unit, and assign the first predetermined interactive characteristic and the second predetermined interactive characteristic to the virtual object in the virtual environment, wherein the first predetermined interactive characteristic comprises a first predetermined manipulating point, a first predetermined manipulating hand gesture and a first predetermined manipulating movement, and the second predetermined interactive characteristic comprises a second predetermined manipulating point, a second predetermined manipulating hand gesture and a second predetermined manipulating movement, the virtual object manipulated in a first predetermined manipulating manner when a manipulating point, a manipulating hand gesture and a manipulating movement of a user respectively correspond the first predetermined manipulating point, the first predetermined manipulating hand gesture and the first predetermined manipulating movement, the virtual object is not manipulated in the first predetermined manipulating manner when at least one of the manipulating point, the manipulating hand gesture and the manipulating movement of the user does not correspond to at least one of the first predetermined manipulating point, the first predetermined manipulating hand gesture and the first predetermined manipulating movement, the virtual object is manipulated in a second manipulating manner when the manipulating point, the manipulating hand gesture and the manipulating movement of the user respectively correspond the second predetermined manipulating point, the second predetermined manipulating hand gesture and the second predetermined manipulating movement, and the virtual object is not manipulated in the second predetermined manipulating manner when at least one of the manipulating point, the manipulating hand gesture and the manipulating movement of the user does not correspond to at least one of the second predetermined manipulating point, the second predetermined manipulating hand gesture and the second predetermined manipulating movement, and the second predetermined manipulating point, the second manipulating hand gesture and the second manipulating movement are different from the first predetermined manipulating point, the first manipulating hand gesture and the first manipulating movement.

7. The method of claim 6, further comprising:
utilizing a tracking unit of the head mounted display system to track at least one of hands of a user, eyes of the user and a remote controller operated by the user, so as to generate a tracking result with at least one interactive input.

8. The method of claim 7, further comprising:
manipulating the virtual object according to the at least one interactive input of the tracking result of the tracking unit when the at least one interactive input of the tracking result of the tracking unit meets the first predetermined interactive characteristic or the second predetermined interactive characteristic.

9. The method of claim 8, wherein the at least one interactive input of the tracking result of the tracking unit comprises at least one of a manipulating point, a manipulating hand gesture and a manipulating movement.

10. The method of claim 6, wherein the first predetermined interactive characteristic further comprises at least one of a first predetermined framework, a first predetermined reacting point, a first predetermined reacting movement and a first predetermined reacting effect, and the second predetermined interactive characteristic further comprises at least one of a second predetermined framework, a second predetermined reacting point, a second predetermined reacting movement and a second predetermined reacting effect.

11. A non-transitory computer readable storage medium storing a program that causes a head mounted display system to execute a process, the process comprising:
utilizing a scanning unit of the head mounted display system to scan a real object in a real environment so as to generate a scanning result; and
utilizing a processing unit of the head mounted display system to identify the real object according to the scanning result of the scanning unit, determine a first predetermined interactive characteristic and a second predetermined interactive characteristic according to an identification result of the processing unit, create the virtual object in the virtual environment simulating the real object in the real environment according to the scanning result of the scanning unit, and assign the first predetermined interactive characteristic and the second predetermined interactive characteristic to the virtual object in the virtual environment, wherein the first predetermined interactive characteristic comprises a first predetermined manipulating point, a first predetermined manipulating hand gesture and a first predetermined manipulating movement, and the second predetermined interactive characteristic comprises a second predetermined manipulating point, a second predetermined manipulating hand gesture and a second predetermined manipulating movement, the virtual object is manipulated in a first predetermined manipulating manner when a manipulating point, a manipulating hand gesture and a manipulating movement of a user respectively correspond the first predetermined manipulating point, the first predetermined manipulating hand gesture and the first predetermined manipulating movement, the virtual object is not manipulated in the first predetermined manipulating manner when at least one of the manipulating point, the manipulating hand gesture and the manipulating movement of the user does not correspond to at least one of the first predetermined manipulating point, the first predetermined manipulating hand gesture and the first predetermined manipulating movement, the virtual object is manipulated in a second manipulating manner when the manipulating point, the manipulating hand gesture and the manipulating movement of the user respectively correspond the second predetermined manipulating point, the second predetermined manipulating hand gesture and the second predetermined manipulating movement, and the virtual object is not manipulated in the second predetermined manipulating manner when at least one of the manipulating point, the manipulating hand gesture and the manipulating movement of the user does not correspond to at least one of the second predetermined manipulating point, the second predetermined manipulating hand gesture and the second predetermined manipulating movement, and the second predetermined manipulating point, the second manipulating hand gesture and the second manipulating movement are different from the first predetermined manipulating point, the first manipulating hand gesture and the first manipulating movement.

12. The non-transitory computer readable storage medium of claim 11, wherein the process further comprises:

utilizing a tracking unit of the head mounted display system to track at least one of hands of a user, eyes of the user and a remote controller operated by the user, so as to generate a tracking result with at least one interactive input.

13. The non-transitory computer readable storage medium of claim 12, wherein the process further comprises:
manipulating the virtual object according to the at least one interactive input of the tracking result of the tracking unit when the at least one interactive input of the tracking result of the tracking unit meets the first predetermined interactive characteristic or the second predetermined interactive characteristic.

14. The non-transitory computer readable storage medium of claim 13, wherein the at least one interactive input of the tracking result of the tracking unit comprises at least one of a manipulating point, a manipulating hand gesture and a manipulating movement.

15. The non-transitory computer readable storage medium of claim 11, wherein the first predetermined interactive characteristic further comprises at least one of a first predetermined framework, a first predetermined reacting point, a first predetermined reacting movement and a first predetermined reacting effect, and the second predetermined interactive characteristic further comprises at least one of a second predetermined framework, a second predetermined reacting point, a second predetermined reacting movement and a second predetermined reacting effect.

* * * * *